(12) United States Patent
Babu et al.

(10) Patent No.: US 11,470,507 B2
(45) Date of Patent: Oct. 11, 2022

(54) METHODS AND SYSTEM FOR MACHINE LEARNING-BASED DATA RATE CONTROL

(71) Applicant: APRECOMM PRIVATE LIMITED, Bangalore (IN)

(72) Inventors: Gummaraj Pramod Babu, Bangalore (IN); Sivakumar Guharajan, Bangalore (IN)

(73) Assignee: Aprecomm Private Limited, Bangalore (IN)

( * ) Notice: Subject to any disclaimer, the term of this patent is extended or adjusted under 35 U.S.C. 154(b) by 897 days.

(21) Appl. No.: 16/288,438

(22) Filed: Feb. 28, 2019

(65) Prior Publication Data
US 2019/0268807 A1  Aug. 29, 2019

(51) Int. Cl.
| H04W 28/10 | (2009.01) |
| H04W 28/02 | (2009.01) |
| G06N 3/08 | (2006.01) |
| H04L 1/08 | (2006.01) |

(52) U.S. Cl.
CPC ............ H04W 28/10 (2013.01); G06N 3/08 (2013.01); H04L 1/08 (2013.01); H04W 28/0284 (2013.01); H04W 28/0289 (2013.01)

(58) Field of Classification Search
CPC ....... H04L 47/25; H04L 1/08; H04W 28/0284
See application file for complete search history.

(56) References Cited

U.S. PATENT DOCUMENTS

| 10,243,864 B1* | 3/2019 | Jorgovanovic ...... H04L 43/0847 |
| 2017/0195898 A1* | 7/2017 | Logan .................... H04W 24/02 |
| 2018/0249345 A1* | 8/2018 | Farkas ................... G06N 5/048 |
| 2019/0149476 A1* | 5/2019 | Gervais .................. H04L 47/14 709/233 |

\* cited by examiner

*Primary Examiner* — Marcus Smith

(57) ABSTRACT

Embodiments herein provide a method for machine learning-based data rate control in a wireless network system. The method includes detecting a rate change event by a data rate controller for at least one receiving node in the wireless network system. Furthermore, the method includes dynamically generating a data rate configuration comprising a data rate configuration comprising a plurality of rates, and an accuracy level of each of the rates. The method further includes determining by the data rate controller that the accuracy level of at least one rate from the plurality of rates meets an accuracy criteria and causing by the data rate controller to transmit at least one packet using the at least one rate.

36 Claims, 10 Drawing Sheets

METHODS AND SYSTEM FOR MACHINE LEARNING-BASED DATA RATE CONTROL

TECHNICAL FIELD

The present disclosure relates to methods and system for machine learning-based data rate control, specifically methods and systems for machine learning-based rate control in wireless networks. The present application is based on, and claims priority from an Indian application No. 201841007609 filed on Feb. 28, 2018. The disclosure of which is hereby incorporated by reference.

BACKGROUND

Rate control is a crucial factor in enhancing stability and reliability in wireless networks. Traditional rate control algorithms use probability of error rates to select the best possible rate. This requires a wireless device to transmit at higher/lower (Called Probing Packets) rates and fall back to the right rates at which it can transmit. This rate adjustment is a continuous finding of the best possible rate at which device transmissions are made to achieve high throughput and at best channel utilization. Conventional methods result in wastage of critical airtime impacting performance as probing packets also consume channel bandwidth and they could result in packet errors.

Thus, there remains a need for a robust mechanism to improve channel usage, quickly determine efficient packet rate, reduce packet errors, and enhance performance. Further, the best possible rates for data transmission need to be determined to save valuable airtime and provide increased performance.

The above information is presented as background information only to help the reader to understand the present invention. Applicants have made no determination and make no assertion as to whether any of the above might be applicable as Prior Art with regard to the present application.

SUMMARY

Accordingly, the embodiments herein provide a method for machine learning-based data rate control in a wireless network system. The method includes detecting a rate change event by a data rate controller for at least one receiving node in the wireless network system. Furthermore, the method includes dynamically generating a data rate configuration comprising a data rate configuration comprising a plurality of rates, and an accuracy level of each of the rates. The method further includes determining by the data rate controller that the accuracy level of at least one rate from the plurality of rates meets an accuracy criteria and causing by the data rate controller to transmit at least one packet using the at least one rate.

In an embodiment, the method further comprises receiving, by the data rate controller, a feedback of the transmission of the at least one packet from the at least one node, determining, by the data rate controller, that the transmission of the at least one packet is unsuccessful using the at least one rate, and selecting, by the data rate controller, another rate from the plurality of rates that meets the accuracy criteria for retransmission of the at least one packets. Further the method includes determining, by the data rate controller, that a number of retransmission of the at least one packet meets a retry criteria and causing, by the data rate controller, to transmit the at least one packet using a pseudo rate.

In an embodiment, the deep learning model is dynamically updated based a feedback received from each node in the wireless network system. Further, the data rate configuration is one of a node-based data rate configuration and a global data rate configuration.

In an embodiment, the parameters associated with the at least one node include a node type, a received signal strength indication (RSSI), a packet length, a current rate of transmission, a number of packet failures, a channel usage, and a client capability rate.

In an embodiment, the deep learning model is dynamically trained based at least one of a feedback received from each node in the wireless network system and a feedback of a pseudo rate determined by a rate controlling technique.

In an embodiment, the node-based data rate configuration comprises an organizational unique identifier, an RSSI, an aggregate length and channel congestion.

Accordingly, the embodiments herein provide a method for machine learning-based data rate control in a wireless network system. The method includes receiving, by a data rate controller, a data rate configuration request for the wireless network system, dynamically generating, by the data rate controller, a data rate configuration comprising at least one rate specific to parameters associated with at least one receiving node in the wireless network system and an accuracy level of the at least one rate, detecting, by the data rate controller, that an accuracy level of the data rate configuration meets an accuracy criteria and providing, by the data rate controller, the data rate configuration to the at least one node to transmit at least one packet in the wireless network.

In an embodiment, the data rate controller dynamically generates a data rate configuration includes receiving the parameters associated with the at least one node, determining the plurality of rates specific to the parameters and the accuracy level of each of the rates using an analysis of a deep learning model and generating the data rate configuration based on the analysis. In other embodiments, the deep learning model is dynamically trained based at least one of a feedback received from each node in the wireless network system and a feedback of a pseudo rate determined by a rate controlling technique.

In an embodiment, the method further includes receiving, by the data rate controller, a feedback of the transmission of the at least one packet from the wireless communication network and determining by the data rate controller a current accuracy of the wireless network system based on the feedback. The method further includes determining, by the data rate controller, whether the current accuracy of the data rate configuration meets the accuracy criteria. Furthermore, the method includes causing one of continue using the data rate configuration in the wireless network system in response to determining that the current accuracy of the data rate configuration meets the accuracy criteria and correct the data model configuration using at least one pseudo rate in response to determining that the current accuracy of the data rate configuration meets the accuracy criteria.

Accordingly, the embodiments herein provide a device for machine learning-based data rate control in a wireless network system, the device includes a processor, a memory and a data rate controller coupled to the processor and the memory. The data rate controller is configured to receive a data rate configuration request for the wireless network system, dynamically generate a data rate configuration comprising at least one rate specific to parameters associated with at least one receiving node in the wireless network system and an accuracy level of the at least one rate, detect that an accuracy level of the data rate configuration meets an accuracy criteria; and provide the data rate configuration to the at least one node to transmit at least one packet in the wireless network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
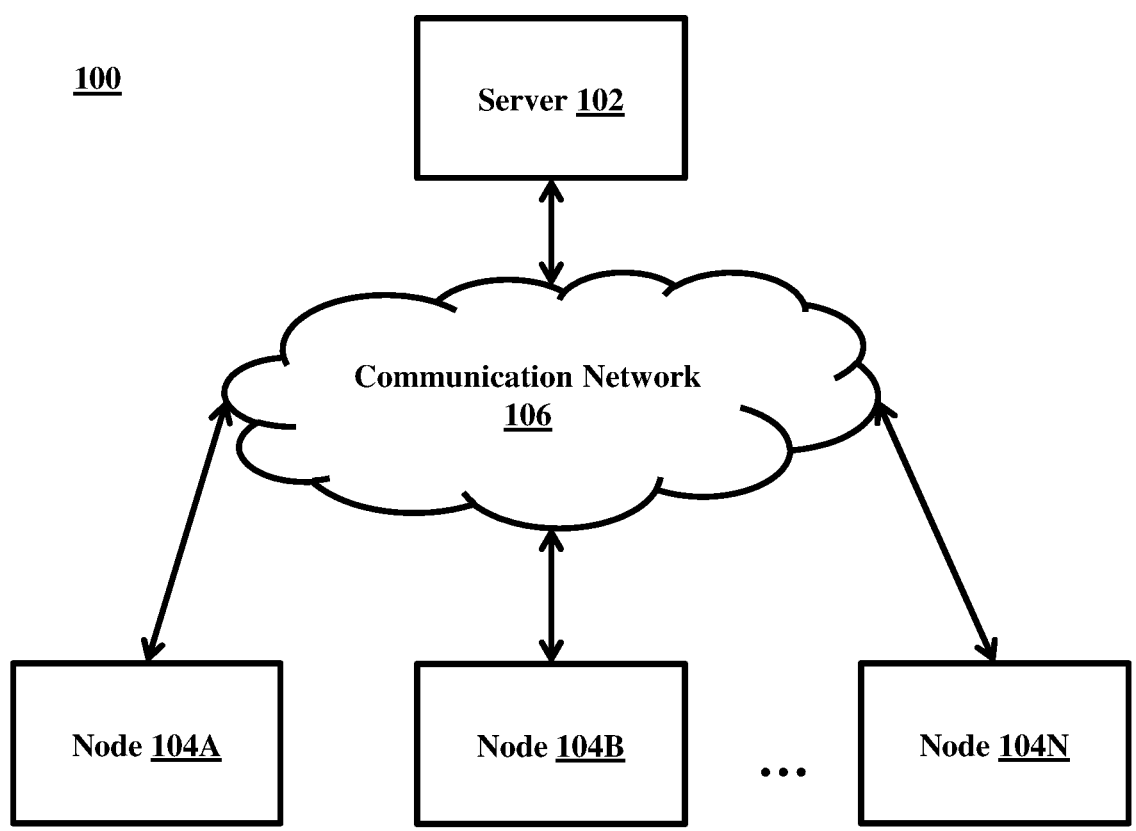
FIG. 1 illustrates a network environment in which a server and a plurality of nodes are connected through a communication network, according to an embodiment disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Referring now to the drawings, and more particularly to FIGS. 1 through 7, where similar reference characters denote corresponding features consistently throughout the figures, there are shown preferred embodiments.

FIG. 1 illustrates a network environment 100 in which a server 102 is connected to a plurality of nodes 104A, 104B to 104N (hereinafter referred to as the node 104) through a communication network 106.

The communication network 106 can include a data network such as, but not restricted to, the Internet, local area network (LAN), wide area network (WAN), metropolitan area network (MAN) etc. In certain embodiments, the communication network 106 can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. In some embodiments, the communication network 106 may include or otherwise cover networks or sub-networks, each of which may include, for example, a wired or wireless data pathway. The communication network 106 may include a circuit-switched voice network, a packet-switched data network, or any other network capable for carrying electronic communications. For example, the network may include networks based on the Internet protocol (IP) or asynchronous transfer mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the communication network 106 may further include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth. Embodiments are intended to include or otherwise cover any type of network, including known, related art, and/or later developed technologies to connect the server 102 and the node 104 with each other.

The node 104 is an access point or a networking hardware device that allows a wireless device to the communication network 106. In some embodiments, the node 104 is classified based on an organization unique identifier (OUI) from a media access control (MAC) address of the node 104. In some embodiments, the node 104 can also be an edge device.

The server 102 includes a non-transitory computer medium that can be configured to receive and transmit communication requests and/or communication responses to and from the node 104. The server 102 can be any or a combination of a server, a local computer connected to the communication network 106 or an edge device connected to the communication network 106.

Figure 2A:
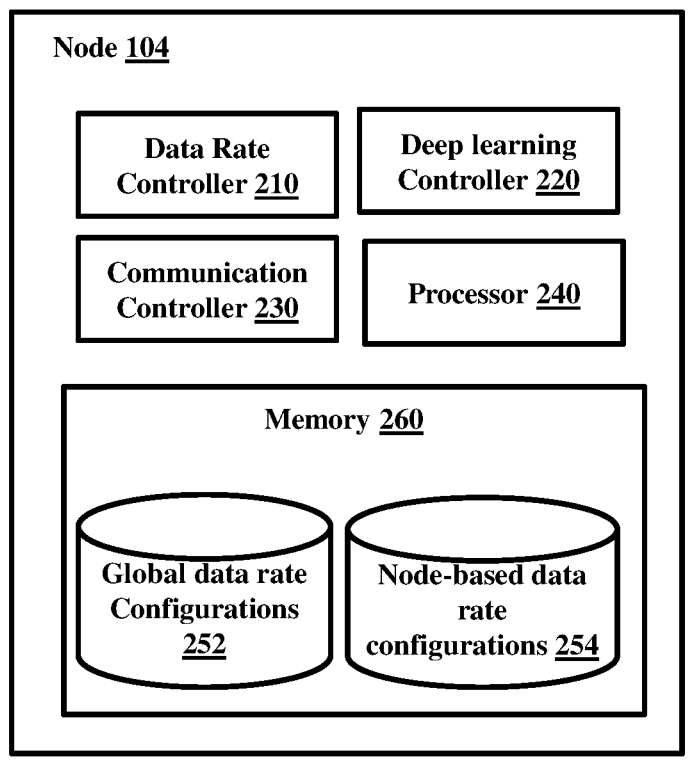
FIG. 2A illustrates hardware components of the node in a wireless network system, according to an embodiment disclosed herein.

FIG. 2A illustrates hardware components of the node 104 in the communication network 106. The node 104 is a wireless device that acts as an access point in the wireless network. The node 104 includes a data rate controller 210, a deep learning controller 220, a communications controller 230, a processor 240 and a memory 260. The memory 260 further includes a global data rate configuration 252 and a node-based data rate configuration 254.

The data rate controller 210 is a hardware component that determines the data rates of packets transmitted or received by the node 104. The processor 240 may be, but not restricted to, a Central Processing Unit (CPU), a microprocessor, or a microcontroller. The processor 240 is coupled to the data rate controller 210, the deep learning controller 220, the memory 260 and the communication controller 230. The processor 240 executes sets of instructions stored on the memory 260.

The memory 260 may be, but not restricted to, an electronic, optical, magnetic, or other storage or transmission device capable of providing the processor 270 with computer-readable instructions. The memory 260 can include, but is not limited to, a floppy disk, a compact disk, a digital versatile disk, a magnetic disk, a memory chip, a read only memory (ROM), a random access memory (RAM), all optical media, all magnetic tape or other magnetic media, or any other medium from which the processor 240 can read instructions. The instructions may comprise code from any suitable computer-programming language, including, but not restricted to, C, C++, C#, Visual Basic, Java, Python, Perl, and JavaScript. The memory 260 further includes a global data rate configuration 252 and a node-based data rate configuration 254. The global data rate configuration 252 includes success percentage of each rate for a specific node capability, received signal strength indication (RSSI) and congestion. The node-based data rate configuration 254 includes success percentage of each rate for a node type based on the OUI of the node 104, specific node capability, RSSI and congestion. For example, the global data rate configuration 252 can include the following tabulated information:

TABLE 1

| | | | | Global Table | | | |
|---|---|---|---|---|---|---|---|
| RSSI | Congestion | Aggregate Length. | Mode | Rates/Success Percentage | NSS | Bandwidth | Flags |
| 10 | 30 | 32000 | 11n | 3/80, 2/90, 1/95 . . . | 3 | 20 | 0x1 |
| 15 | 40 | 54000 | 11ac | 2/80, 3/70 . . . | 4 | 80 | 0x1 |
| 20 | 50 | 1500 | 11a | 11/70, 36/80, 55/60 . . . | 1 | 20 | 0x2 |

Similarly, the node-based data rate configuration 254 can include the following:

TABLE 2

| | | | | Node Table | | | |
|---|---|---|---|---|---|---|---|
| NodeType | RSSI | Congestion | Aggregate Length | Mode | Success % | NSS | Bandwidth | Flags |
| OUI1 | 10 | 30 | 50000 | 11n | 3/80, 2/90, 1/95 . . . | 3 | 20 | 0x1 |
| OUI2 | 15 | 40 | 1500 | 11ac | 2/80, 3/70 . . . | 4 | 80 | 0x1 |
| OUI3 | 20 | 50 | 42000 | 11a | 11/70, 36/80, 55/60 . . . | 1 | 20 | 0x2 |

Figure 2B:
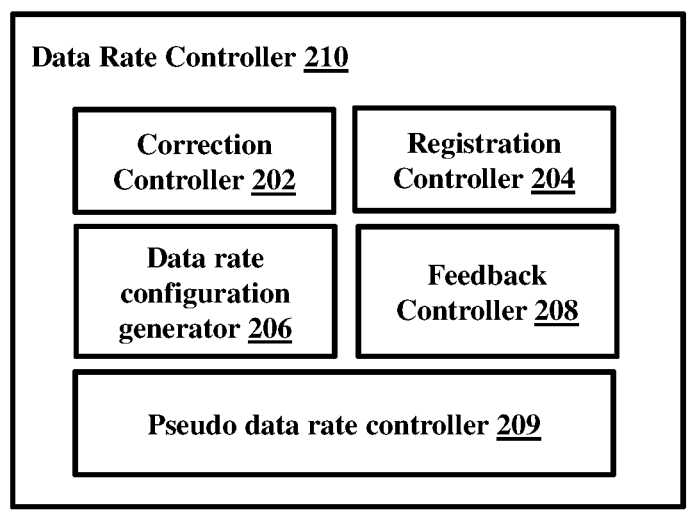
FIG. 2B illustrates hardware components of a data rate controller, according to an embodiment disclosed herein.

FIG. 2B illustrates hardware components of a data rate controller, according to an embodiment disclosed herein. The data rate controller 210 includes a correction controller 202, a registration controller 204, a data rate configuration generator 206, a feedback controller 208 and a pseudo data rate controller 209. The correction controller is a chipset that compares accuracy from a deployed rate control deep learning model and a generated rate control deep learning model.

The data rate controller 210 detects a rate change event for the node 104. The data rate configuration generator 206 dynamically generates a data rate configuration comprising a plurality of rates and an accuracy level for each of the rates. The feedback controller 208 determines the accuracy level of at least one rate of the plurality of rates that meets an accuracy criteria. Using the rate for which the accuracy level is determined to be meeting the accuracy criteria, the data rate controller 210 causes at least one data packet to be transmitted.

The data rate configuration generator 206 receives a plurality of parameters associated with the node 104. The parameters associated with the node can be but not limited to a node type (OUI), an RSSI, a packet length a current rate of transmission, a number of packet failures, a channel usage, and a client capability rate. Rates specific to the parameters associated with node 104 are determined and accordingly the accuracy level of each rate is determined using an analysis of a deep learning model generated by the deep learning controller 220. Based on the analysis, the data rate configuration is generated. The data rate configuration is stored in the database for node-based data rate configuration 254.

For each transmission of a data packet using a determined rate, feedback is received from each node or entity on the wireless network 106. The deep learning model is dynamically updated based on the feedback.

In some embodiments, the pseudo data rate controller 209 provides reference data rates with which data packets are transmitted from the node 104. The deep learning model is dynamically trained based on the feedback received by the feedback controller 208. The data rate controller 210 selects the data rates whose accuracy is greater than other models and if its greater than minimal threshold. If the selected model accuracy is lower than a minimal threshold, the data rate controller 210 selects a pseudo accuracy of the selected model.

Figure 3A:
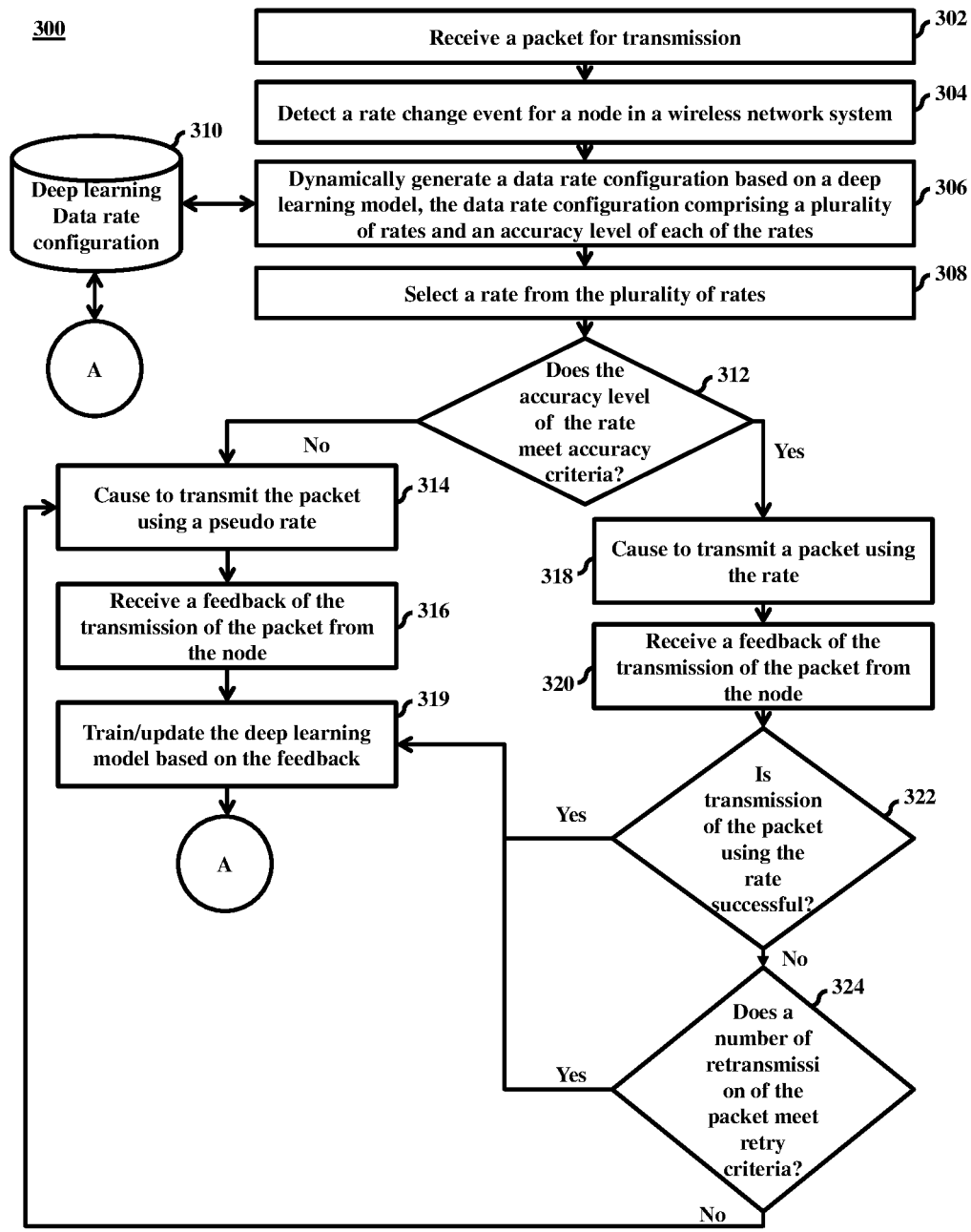
FIGS. 3A and 3B are flow diagrams illustrating a method for machine learning-based data rate control for a node in the wireless network system, according to an embodiment disclosed herein.
Figure 3B:
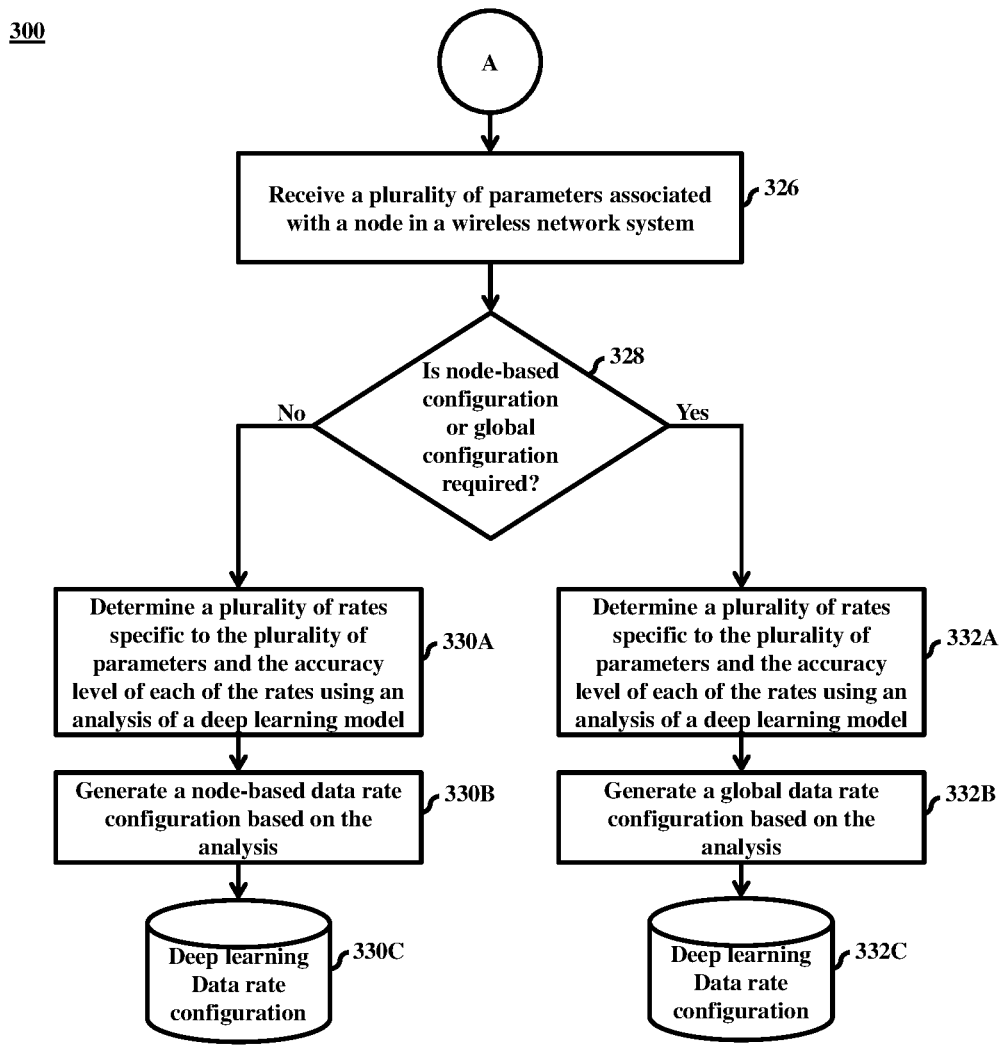

FIGS. 3A and 3B are flow diagrams illustrating a method for machine learning-based data rate control for a node in the wireless network system, according to an embodiment disclosed herein. At step 302, the node 104 receives a packet for transmission. At step 304, the data rate controller 210 detects a rate change event. Based on the deep learning model implemented by the deep learning controller 220, at step 306, the data rate configuration is dynamically generated. The data rate configuration includes multiple dates and accuracy levels for each of the rates. At step 308, the data rate controller 210 selects a rate from the multiple rates and the data rate controller 210 checks if the accuracy level of the selected rate meets the accuracy criteria.

If the accuracy level meets the accuracy criteria (step 312), at step 318, the data rate controller 210 causes a packet to be transmitted using the selected rate. At step 320, the feedback controller 208 receives a feedback of the transmission of the packet. Based on the feedback, the feedback controller 208 determines if the transmission of the packet is successful. The feedback can be but not limited to an acknowledgement transmitted from a recipient of the data packet or a return of the data packet transmitted back to the node 104. Further, the feedback information includes the receiving node RSSI/CAPS, aggregation length, current channel utilization, number of attempts for transmission, and a Model ID used to select the rate. Accordingly, if the packet transmission is successful (step 322), the deep learning controller 220 updates the deep learning model with the selected rate. The accuracy of the model is determined using the ratio of the number of data packets transmitted to the number of successful transmission without retry.

In the event that the transmission is not successful, further attempts are made to transmit the data packet at the selected data rate. At step 324, based on the feedback, if the number of attempts exceeds a threshold or meets a retry criteria, the selected rate is rejected by the data rate controller, and a pseudo data rate provided by the pseudo rate controller 209 is used to transmit the data packet.

At step 312, if the accuracy level of the rates is mismatched with the accuracy criteria, the pseudo rate is used to transmit the data rate. The node 104 is caused to transmit the data packet using the pseudo rate and accordingly receives a feedback. The feedback includes the receiving node RSSI/CAPS, aggregation length, current channel utilization, number of attempts for transmission, and a Model ID used to select the pseudo rate. Based on the feedback, the feedback controller 208 determines of the transmission is successful or has failed. Accordingly the deep learning model is updated.

As shown in FIG. 3B, the success percentage of the data rate used to transmit the data packet in step 314 is determined from the various parameters received by the feedback controller 208. Based on the success percentage, the deep learning controller 220 determines if a node-based configuration or global configuration is required. If the node-based configuration is required, the data rate controller 210 determines multiple data rates specific to the parameters received as feedback by the feedback controller 208. Further, the accuracy levels of each of the determined rates are computed using the analysis of the deep learning model. A node-based data rate configuration is further generated and stored in the memory 260 (Steps 330B and 330C). Similarly, if a global configuration is required, the global data rate configuration is generated based on the analysis of the deep learning model. The global data configuration is stored in the memory 260 (Steps 332A, 332B and 332C).

Figure 4A:
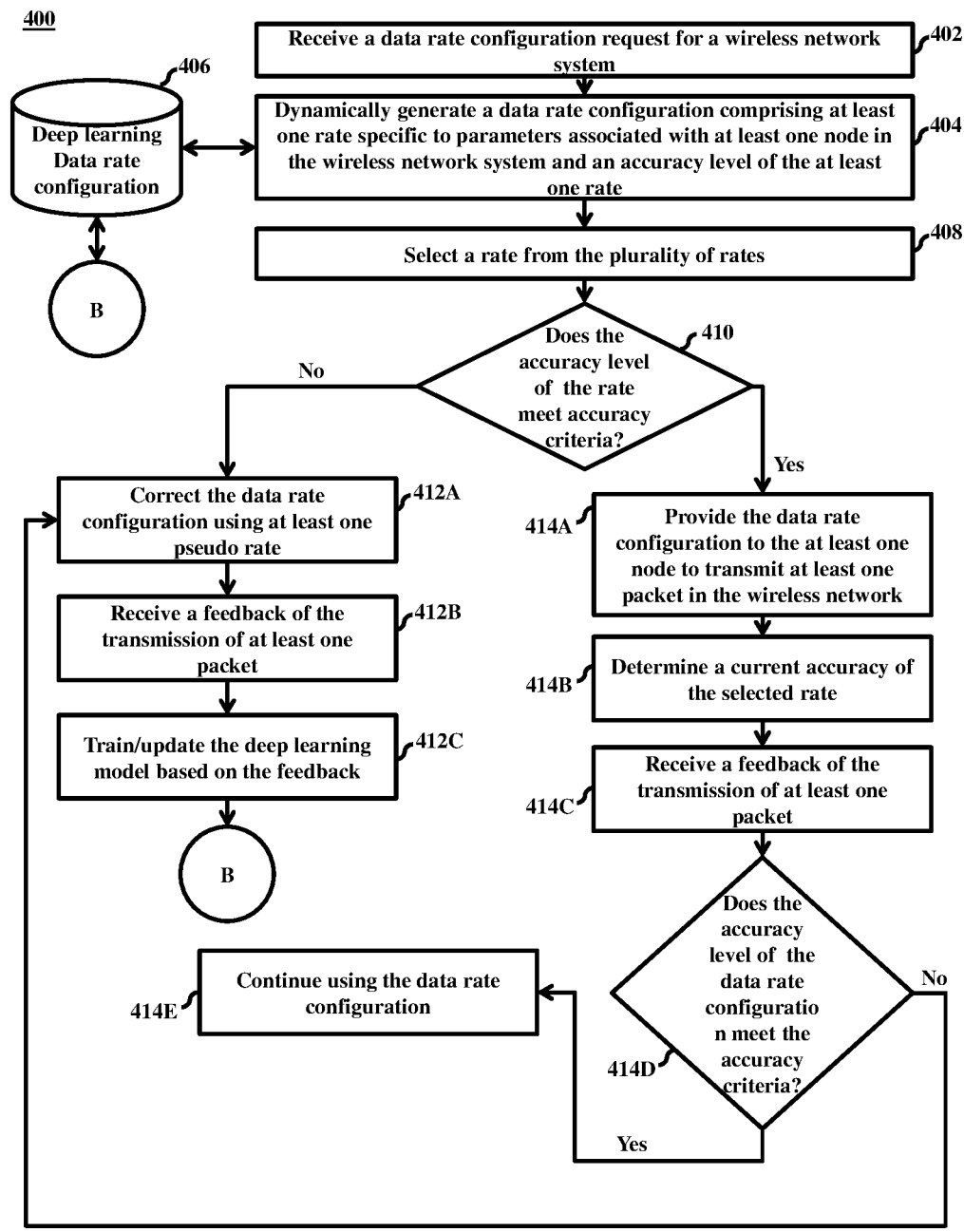
FIGS. 4A and 4B are flow diagrams illustrating a method to generate a data rate configuration, according to an embodiment disclosed herein.
Figure 4B:
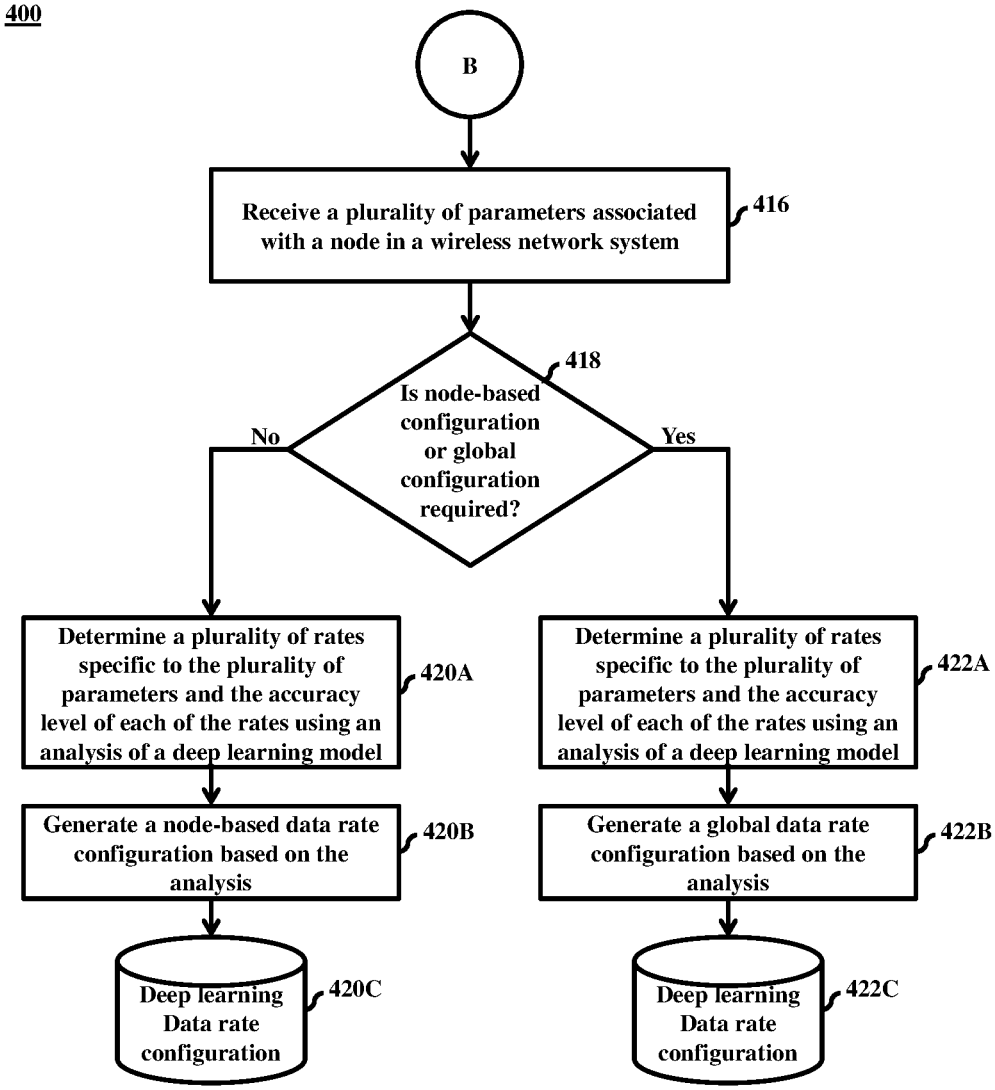

FIGS. 4A and 4B are flow diagrams illustrating a method to generate a data rate configuration, according to an embodiment disclosed herein. In FIG. 4A, at step 402, the data rate controller 210 receives a data rate configuration request for the wireless network 100. Based on the request, a data rate configuration is dynamically generated with the data rate configuration including multiple rates specific to parameters associated with the node 104 and an accuracy level of the multiple rates. At step 408, the data rate controller 210 selects a rate from the multiple rates. If the accuracy level corresponding to the selected rate meets accuracy criteria, the data rate configuration is utilized to transmit a data packet over the network 106 at step 414A.

A current accuracy of the selected data rate is determined by the data controller 210 at step 414B. Based on the data packet transmitted, a feedback including the receiving node RSSI/CAPS, aggregation length, current channel utilization, number of attempts for transmission, and a Model ID used to select the rate is received by the node 104. The data rate controller 210 determines if the accuracy level of the data rate configuration utilized meets accuracy criteria mandated by the deep learning controller 220. If the accuracy criteria are met, the data rate configuration is continued to be utilized for data packet transmission. If the accuracy criteria are not met, the data rate configuration is corrected using a pseudo rate computed by the pseudo rate controller 209. The pseudo rate is also used if the accuracy level of the selected rate does not meet the accuracy criteria. At step 412A, the correction controller 202 modifies the data rate with pseudo rate. The data packet is transmitted using the pseudo rate and based on the feedback received, the deep learning model is trained or updated.

As shown in FIG. 4B, the success percentage of the data rate used to transmit the data packet in step 404 is determined from the various parameters received by the feedback controller 208. Based on the success percentage, the deep learning controller 220 determines if a node-based configuration or global configuration is required. If the node-based configuration is required, the data rate controller 210 determines multiple data rates specific to the parameters received as feedback by the feedback controller 208. Further, the accuracy levels of each of the determined rates are computed using the analysis of the deep learning model. A node-based data rate configuration is further generated and stored in the memory 260 (Steps 420B and 420C). Similarly, if a global configuration is required, the global data rate configuration is generated based on the analysis of the deep learning model. The global data configuration is stored in the memory 260 (Steps 422A, 422B and 422C).

Figure 5:
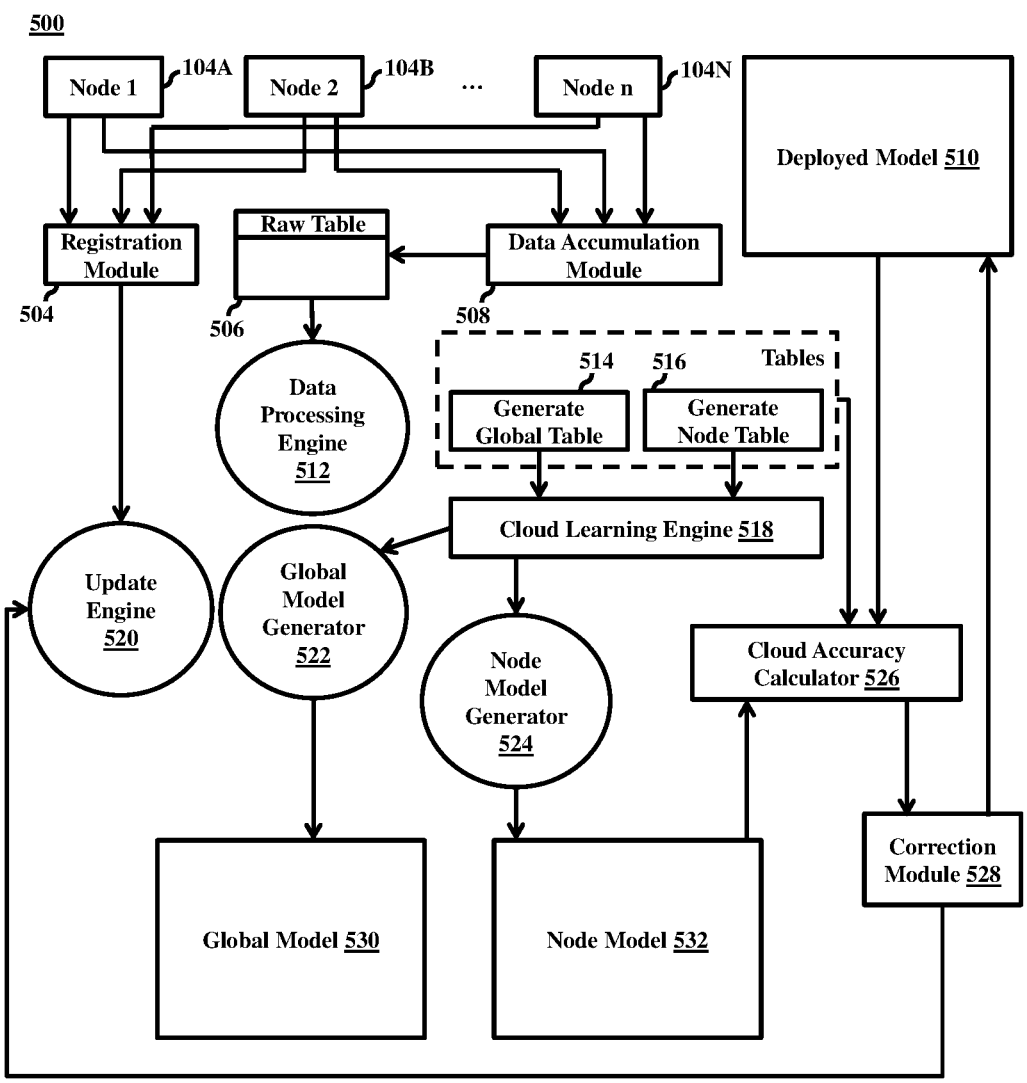
FIG. 5 illustrates architecture of a rate control server, according to an embodiment disclosed herein.

FIG. 5 illustrates architecture 500 of a rate control server, according to an embodiment disclosed herein. The nodes 104A to 104N across various locations within the network system 100 transmit data to a data accumulation module 508. A registration module 502, as shown in FIG. 5, communicates with a cloud server and loads the nodes 104 with the global model and the node-based model. The data accumulation module 508 checks validity of the data transmitted by verifying the registration status of the edge device 502. The data accumulation module 508 further verifies the checksum of the received data and stores the verified data in a distributed database storage such as the raw table 506. A data processing engine 512 processes the data stored in the raw table 506 and segregates the data into a global table and a node table. The global table includes data that capture the behavior of the nodes 104. Further, the global table includes the success percentage of each rate as per the parameters specific node capability, RSSI and congestion. The node table includes success percentage of each rate for parameters such as but not limited to node type (OUI), node capability, RSSI and congestion.

As shown in FIG. 5, the global table 514 and the node table 516 are used to update and/or train two learning models namely, the global model and the node-based model. Data provided by the global table is used to train a deep learning neural network classification model which is shown as a cloud learning engine 518. The architecture 500 further includes a cloud accuracy calculator that determines the error success percentage for both global and node-based models (global model 530 and node model 532). The error in success is determined from the difference of the rate success percentage of a deployed model 510 and the success percentage from the generated table. For example, the error in success percentage pertaining to a rate in the node-based table is determined by the following equations:

Ri=Rate Success Percentage of Maturing Model
Rj=Rate Success Percentage from generated table
GPi=(Ri−Rj)

$$\mu = \Sigma_{i=}{}^n GPi/N,$$

where i is the average rate in rate series for given node capability, RSSI and congestion, 'n' is highest possible rate in the series for given node capability, RSSI and congestion and
N is total number of rates above average rate Ri.

The architecture 500 further includes a correction module 528 which compares the accuracy (μ) from the deployed model 510 and the generated models 530 and 532. If the accuracy of the generated model is greater than the deployed model 510, the generated model is deployed to the nodes 104.

The architecture 500 also includes an update engine 520 that transmits an updating event to the node 104. The node 104, upon receiving the updating event, replaces the current model used by the deep learning controller 220 and accordingly updates the global data rate configurations 252 and the node-based data rate configurations 254.

Figure 6A:
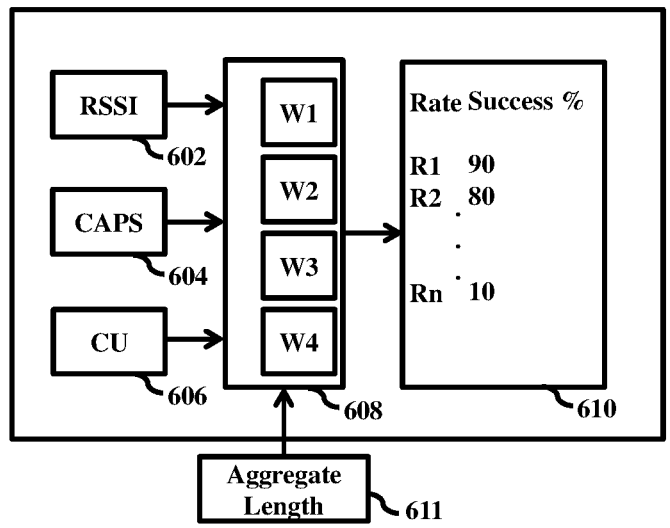
FIG. 6A illustrates a global configuration model in connection with architecture of the rate control server, according to an embodiment disclosed herein.

FIG. 6A illustrates the global configuration model 530 in connection with the architecture 500, according to an embodiment disclosed herein. Specifically, parameters as the RSSI 602, capability 604 and channel utilization 606 along with aggregate length 611 are transmitted by way of feedback to the rate model to obtain a plurality success rates as shown in the success rate configuration 610.

Figure 6B:
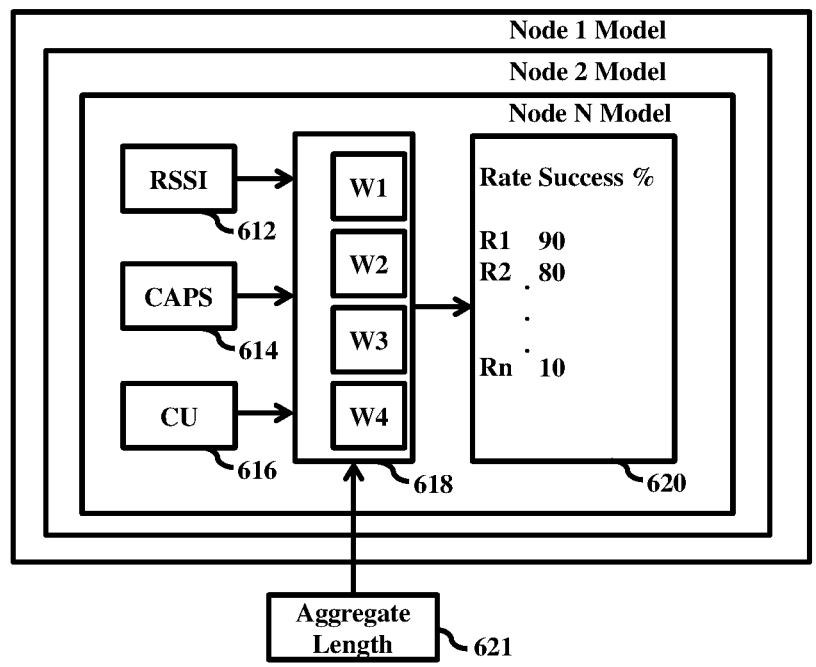
FIG. 6B illustrates a nodal configuration model in connection with the architecture of the rate control server, according to an embodiment disclosed herein.

FIG. 6B illustrates a node-based configuration model in connection with the architecture 500, according to an embodiment disclosed herein. Specifically, parameters as the RSSI 612, capability 614 and channel utilization 616 along with aggregate length 621 are transmitted by way of feedback to the rate model to obtain a plurality success rates as shown in the success rate configuration 620. Each node model 1 to N corresponds to each of the nodes 104A to 104N.

Figure 6C:
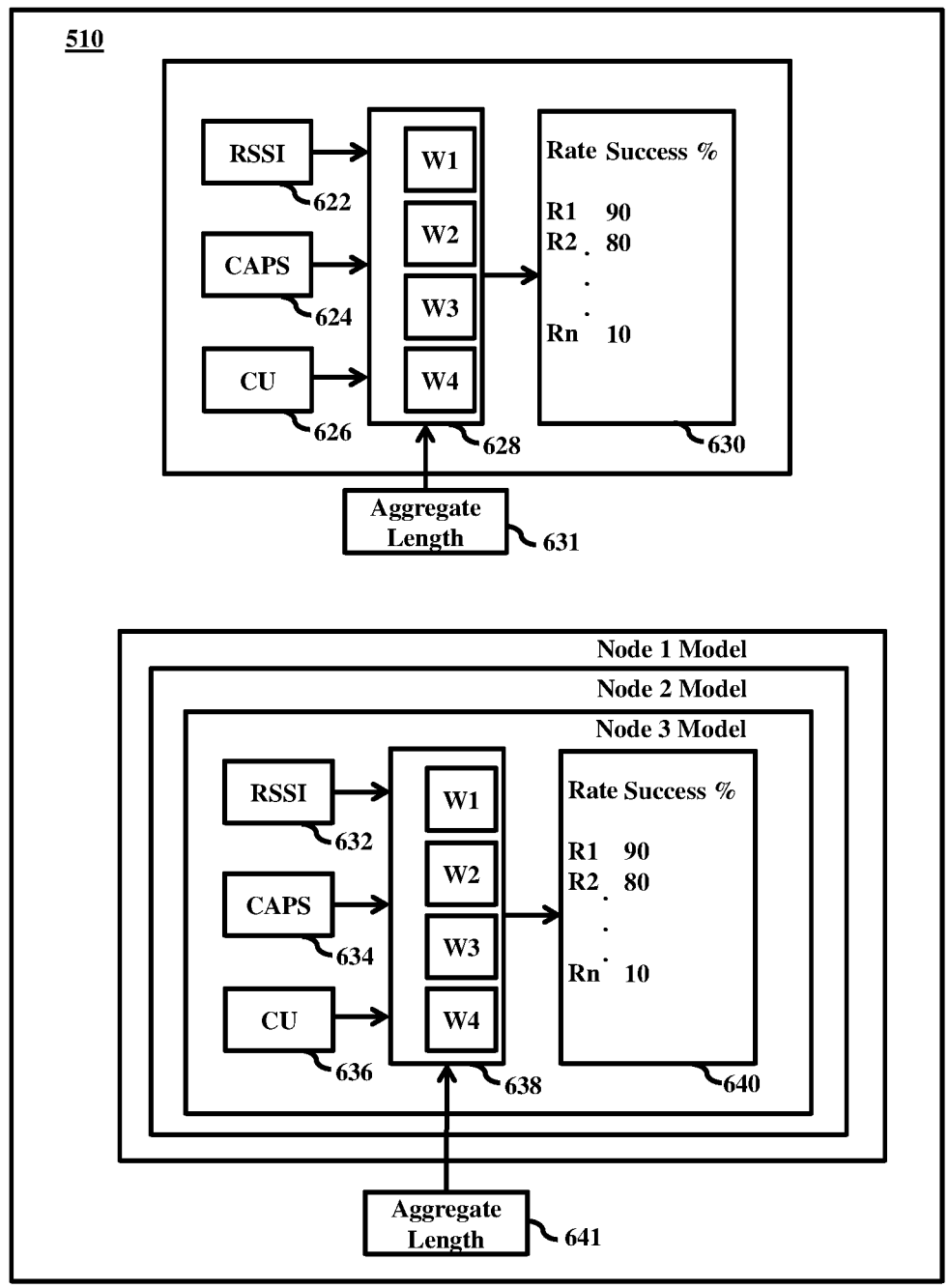
FIG. 6C illustrates a latest deployed model in connection with the architecture of the rate control server, according to an embodiment disclosed herein.

FIG. 6C illustrates a latest deployed model in connection with the architecture 500, according to an embodiment disclosed herein. As can be seen, the deployed model includes a global model and node-based models. The deployed model is updated with the generated when the accuracy criteria are met.

Figure 7:
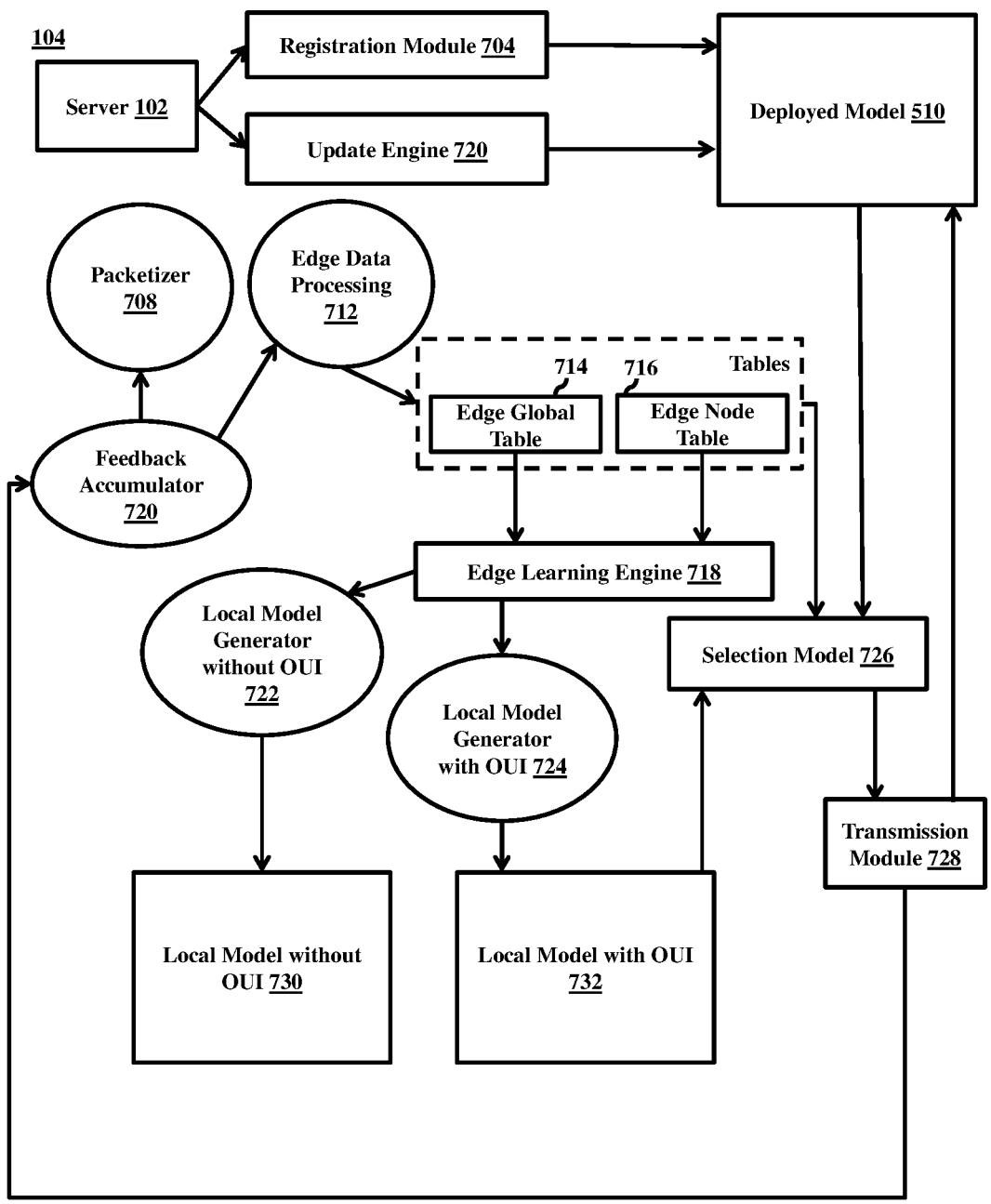
FIG. 7 illustrates architecture of an edge device, according to an embodiment disclosed herein.

FIG. 7 illustrates architecture of a node 104, according to an embodiment disclosed herein. The node 104 includes a registration module 704, as shown in FIG. 7, which communicates with the server 102 and loads the node 104 with the global model and the node-based model. An edge data processing engine 712 generates a global table and a node table based on data rates obtained from the server 102 and the data rates of the node 104. The global table includes data that capture the behavior of the nodes 104. Further, the global table includes the success percentage of each rate as per the parameters specific node capability, RSSI and congestion. The node table includes success percentage of each rate for parameters such as but not limited to node type (OUI), node capability, RSSI and congestion.

As shown in FIG. 7, an edge global table 714 and an edge node table 716 are used to update and/or train two learning models namely, a local model 730 without OUI and a local model 732 with OUI. The local model using a parameter of OUI derives data from the edge node table 716 while the model 730 derives data from the edge global table 714. Data provided by the global table is used to train a deep learning neural network classification model which is shown as an edge learning engine 718. The architecture 700 further includes a selection model 726 that selects the rate to be used for data packet transmission. A transmission module 728 provides the status of packet transmission to a local accuracy calculator and to a feedback accumulator 720. The feedback accumulator 720 sends the feedback to the server via a packetizer 708.

In some embodiments, the selection model 726 determines if a data packet to be transmitted from the node 104 requires a new rate for transmission based channel utilization, receiving node RSSI, aggregation length and a node capability. If the previous data rate is to be used, the data packet is transmitted with the previous. If a new rate is to be selected, the receiving nodes RSSI, node capability, aggregation length and current channel utilization is given as an input to the rate control server 500 and the node 104. In both the architectures, either a node-based model is selected if existing, else a global model is selected to generate a plurality of data rates and their success percentages. A rate is selected if the accuracy level of any selected model meets the accuracy criteria of the network system 100. If the accuracy level are not met, pseudo data rates are computed by the pseudo rate controller 209 (shown in FIG. 2B), and used for data packet transmission. A traditional rate control algorithm is used if the packet transmission fails with pseudo rate or if the pseudo rates are deemed to be not meeting the accuracy criteria.

The embodiments disclosed herein can be implemented through at least one software program running on at least one hardware device and performing network management functions to control the elements. The elements shown in FIG. 1 through 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for machine learning-based data rate control in a wireless network system, comprising:
    detecting, by a data rate controller, a rate change event for at least one receiving node in the wireless network system;
    dynamically generating, by the data rate controller, a data rate configuration based on a deep learning model, wherein the data rate configuration comprises a plurality of rates to be used for transmission of at least one packet from the at least one receiving node in the wireless network, and an accuracy level of each of the rates, wherein the accuracy level of each of the rates are dynamically determined by a number of packets transmitted successfully without retry using the deep learning model;
    selecting a rate from the plurality of rates to be used for transmission of the at least one packet based on a received signal strength indication (RSSI) of the at least one receiving node, a required aggregate length and a current channel congestion in the at least one receiving node;
    determining, by the data rate controller, whether the accuracy level of the selected rate from the plurality of rates meets an accuracy criteria mandated by the deep learning model; and
    causing, by the data rate controller, to transmit the at least one packet using the selected rate from the at least one receiving node in the wireless network when the accuracy level of the selected rate meets the accuracy criteria mandated by the deep learning model.

2. The method of claim 1, wherein dynamically generating, by the data rate controller, the data rate configuration based on the deep learning model comprises:
    receiving a plurality of parameters associated with the at least one receiving node; and
    determining the plurality of rates specific to the plurality of parameters and the accuracy level of each of the rates using an analysis of the deep learning model; and
    generating the data rate configuration based on the analysis.

3. The method of claim 2, wherein the plurality of parameters associated with the data rate configuration of the at least one receiving node comprises a node type, a RSSI, an aggregate length, a current rate of transmission, accuracy, a channel usage, and a client capability rate.

4. The method of claim 1, wherein the method comprises:
    receiving, by the data rate controller, a feedback of transmission of the at least one packet using the selected rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and
    dynamically updating, by the data rate controller, the deep learning model based on a feedback received from the at least one receiving node in the wireless network system.

5. The method of claim 4, wherein the method comprises dynamically training, by the data rate controller, the deep learning model based on at least one of the feedback received from at least one receiving node in the wireless network system.

6. The method of claim 1, wherein the data rate configuration is one of a node-based data rate configuration, and a global data rate configuration.

7. The method of claim 6, wherein the node-based data rate configuration comprises an organizational unique identifier, an RSSI, an aggregate length and channel congestion.

8. The method of claim 6, wherein the global data rate configuration comprises an RSSI, an aggregate length and channel congestion.

9. The method of claim 1, wherein the method further comprises:
    receiving, by the data rate controller, the feedback of the transmission of the at least one packet using the selected rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and
    determining, by the data rate controller, that the transmission of the at least one packet is unsuccessful using the selected rate from the at least one receiving node; and
    selecting, by the data rate controller, another rate from the plurality of rates that meets the accuracy criteria for retransmission of the at least one packet from the at least one receiving node.

10. The method of claim 9, wherein the method further comprises:
    determining, by the data rate controller, that a number of retransmission of the at least one packet meets a retry criteria; and
    causing, by the data rate controller, to transmit the at least one packet using a pseudo rate from the at least one receiving node.

11. A method for machine learning-based data rate control in a wireless network system, comprising:
    receiving, by a data rate controller (210), a data rate configuration request for the wireless network system;
    dynamically generating, by the data rate controller, a data rate configuration based on a deep learning model wherein the data rate configuration comprises at least one rate specific to parameters associated with at least one receiving node to be used for transmission of the at least one packet in the wireless network system and an accuracy level of the at least one rate, wherein the accuracy level of the at least one rate is dynamically determined by a number of packet transmitted successfully without retry using the deep learning model;

detecting, by the data rate controller, whether the accuracy level of the data rate configuration meets an accuracy criteria mandated by the deep learning model; and providing, by the data rate controller, the data rate configuration to the at least one receiving node to transmit the at least one packet in the wireless network when the accuracy level of the at least one rate meets the accuracy criteria mandated by the deep learning model.

12. The method of claim 11, wherein dynamically generating, by the data rate controller, the data rate configuration based on the deep learning model comprises:

receiving the parameters associated with the at least one node; and determining the plurality of rates specific to the parameters and the accuracy level of each of the rates using an analysis of the deep learning model; and generating the data rate configuration based on the analysis.

13. The method of claim 11, wherein the parameters associated with the data rate configuration of the at least one receiving node comprises a node type, a RSSI, a packet length, a current rate of transmission, a number of packet failures, a channel usage, and a client capability rate.

14. The method of claim 12, wherein the method comprises:

receiving, by the data rate controller, a feedback of transmission of the at least one packet using the at least one rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and dynamically updating, by the data rate controller, the deep learning model based on a feedback received from the at least one receiving node in the wireless network system.

15. The method of claim 14, wherein the method comprises dynamically training, by the data rate controller, the deep learning model based on at least one of the feedback received from at least one receiving node in the wireless network system.

16. The method of claim 11, wherein the data rate configuration is one of a node-based data rate configuration, and a global data rate configuration.

17. The method of claim 16, wherein the node-based data rate configuration comprises an organizational unique identifier, an RSSI, an aggregate length and channel congestion.

18. The method of claim 16, wherein the global data rate configuration comprises an RSSI, an aggregate length and channel congestion.

19. The method of claim 11, wherein the method further comprises:

receiving, by the data rate controller, the feedback of the transmission of the at least one packet using the the at least one rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and determining by the data rate controller, a current accuracy of the wireless network system based on the feedback;

determining, by the data rate controller, whether the current accuracy of the data rate configuration meets the accuracy criteria; and causing, by the data rate controller, one of:

continue using the data rate configuration in the wireless network system in response to determining that the current accuracy of the data rate configuration meets the accuracy criteria, and correct the data model configuration using at least one pseudo rate in response to determining that the current accuracy of the data rate configuration meets the accuracy criteria.

20. A device for machine learning-based data rate control in a wireless network system, the node comprising:

a processor;

a memory; and a data rate controller coupled to the processor and the memory, the data rate controller configured to:

detect a rate change event for at least one receiving node in the wireless network system;

dynamically generate a data rate configuration based on a deep learning model wherein the data rate configuration comprises a plurality of rates to be used for transmission of the at least one packet from the at least one receiving node in the wireless network, and an accuracy level of each of the rates, wherein the accuracy level of each of the rates are dynamically determined by a number of packets transmitted successfully without retry using the deep learning model;

select a rate from the plurality of rates to be used for transmission of the at least one packet based on a received signal strength indication (RSSI) of the at least one receiving node, a required aggregate length and a current channel congestion in the at least one receiving node;

determine whether that the accuracy level of the selected rate from the plurality of rates meets an accuracy criteria mandated by the deep learning model; and cause to transmit the at least one packet using the selected rate from the at least one receiving node in the wireless network when the accuracy level of the selected rate meets the accuracy criteria mandated by the deep learning model.

21. The device of claim 20, wherein dynamically generating, by the data rate controller, the data rate configuration based on the deep learning model comprises:

receiving a plurality of parameters associated with the at least one receiving node; and determining the plurality of rates specific to the plurality of parameters and the accuracy level of each of the rates using an analysis of the deep learning model; and generating the data rate configuration based on the analysis.

22. The device of claim 21, wherein the plurality of parameters associated with the data rate configuration of the at least one receiving node comprises a node type, a RSSI, a packet length, a current rate of transmission, a number of packet failures, a channel usage, and a client capability rate.

23. The device of claim 21, wherein the device is configured to:
receive a feedback of transmission of the at least one packet using the selected rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and
dynamically update based on a feedback received from the at least one receiving node in the wireless network system.

24. The device of claim 23, wherein the device dynamically trains the deep learning model based on at least one of the feedback received from at least one receiving node in the wireless network system.

25. The device of claim 20, wherein the data rate configuration is one of a node-based data rate configuration, and a global data rate configuration.

26. The device of claim 25, wherein the node-based data rate configuration comprises an organizational unique identifier, an RSSI, an aggregate length and channel congestion.

27. The method of claim 25, wherein the global data rate configuration comprises an RSSI, an aggregate length and channel congestion.

28. The device of claim 20, wherein the data rate controller is further configured for:
receiving the feedback of the transmission of the at least one packet using the selected rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and
determining that the transmission of the at least one packet is unsuccessful using the selected rate from the at least one receiving node; and
selecting another rate from the plurality of rates that meets the accuracy criteria for retransmission of the at least one packet from the at least one receiving node.

29. The device of claim 28, wherein the data rate controller is further configured for:
determining that a number of retransmission of the at least one packet meets a retry criteria; and
causing to transmit the at least one packet using a pseudo rate from the at least one receiving node.

30. A device for machine learning-based data rate control in a wireless network system, comprising:
a processor;
a memory; and
a data rate controller coupled to the processor and the memory, the data rate controller configured to:
receive a data rate configuration request for the wireless network system;
dynamically generate a data rate configuration based on a deep learning model wherein the data rate configuration comprises at least one rate specific to parameters associated with at least one receiving node to be used for transmission of the at least one packet in the wireless network system and an accuracy level of the at least one rate, wherein the accuracy level of the at least one rate is dynamically determined by a number of packet transmitted successfully without retry using the deep learning model;
detect whether the accuracy level of the data rate configuration meets an accuracy criteria mandated by the deep learning model; and
provide the data rate configuration to the at least one receiving node to transmit the at least one packet in the wireless network when the accuracy level of the at least one rate meets the accuracy criteria mandated by the deep learning model.

31. The device of claim 30, wherein dynamically generating, by the data rate controller, the data rate configuration based on the deep learning model comprises:
receiving the parameters associated with the at least one node; and
determining the plurality of rates specific to the parameters and the accuracy level of each of the rates using an analysis of the deep learning model; and
generating the data rate configuration based on the analysis.

32. The device of claim 31, wherein the parameters associated with the data rate configuration of the at least one receiving node comprises a node type, a RSSI, a packet length, a current rate of transmission, a number of packet failures, a channel usage, and a client capability rate.

33. The device of claim 30, wherein the device is configured to:
receive a feedback of transmission of the at least one packet using the at least one rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and
dynamically updates the deep learning model based on a feedback received from the at least one receiving node in the wireless network system.

34. The device of claim 33, wherein the device dynamically trains the deep learning model based on at least one of the feedback received from at least one receiving node in the wireless network system.

35. The device of claim 31, wherein the data rate configuration is one of a node-based data rate configuration, and a global data rate configuration.

36. The device of claim 30, wherein the data rate controller is further configured for:
receiving the feedback of the transmission of the at least one packet using the at least one rate from the at least one receiving node, wherein the feedback comprises the RSSI of the at least one receiving node that transmits the at least one packet, the aggregate length of the at least one packet to be transmitted, the channel congestion of the at least one receiving node that transmits the at least one packet, and a number of attempts for transmission of the at least one packet from the at least one receiving node; and
determining a current accuracy of the wireless network system based on the feedback;
determining whether the current accuracy of the data rate configuration meets the accuracy criteria; and causing one of:
    continue using the data rate configuration in the wireless network system in response to determining that the current accuracy of the data rate configuration meets the accuracy criteria, and
    correct the data model configuration using at least one pseudo rate in response to determining that the current accuracy of the data rate configuration meets the accuracy criteria.

* * * * *